(No Model.) 2 Sheets—Sheet 1.
J. C. SLAWSON.
STREET SWEEPER.
No. 468,458. Patented Feb. 9, 1892.
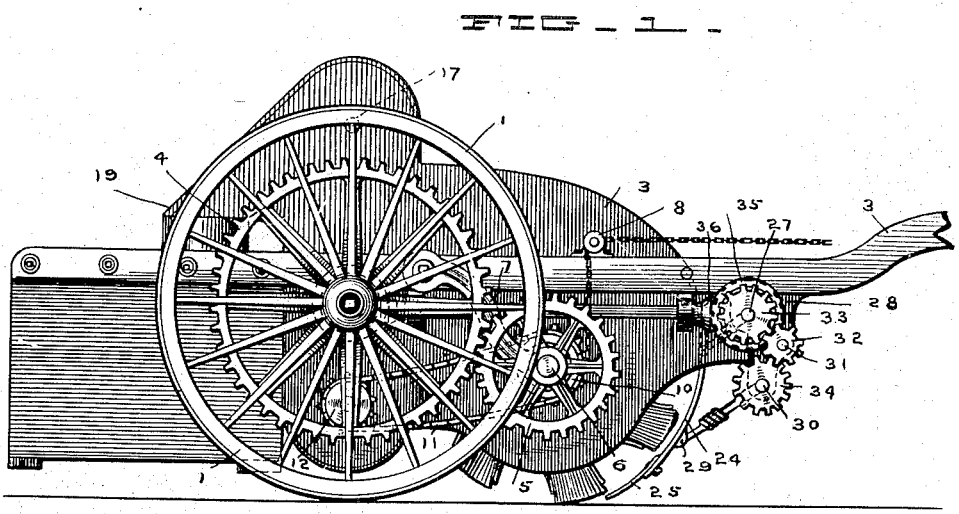
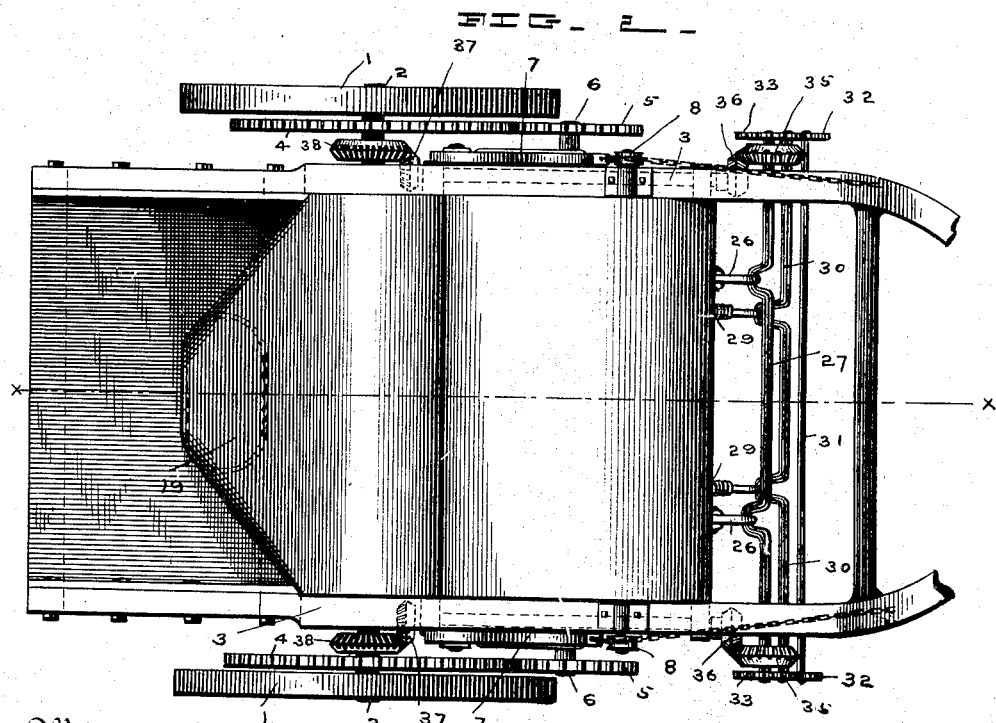
Witnesses
H. D. Nealy.
C. B. Griffith.
Inventor
John C. Slawson,
By his Attorney
C. C. Jacobs.

(No Model.) 2 Sheets—Sheet 2.

J. C. SLAWSON.
STREET SWEEPER.

No. 468,458. Patented Feb. 9, 1892.

Witnesses
H. D. Nealy
C. B. Griffith

Inventor
John C. Slawson,
By his Attorney
C. P. Jacobs.

UNITED STATES PATENT OFFICE.

JOHN C. SLAWSON, OF INDIANAPOLIS, INDIANA, ASSIGNOR OF TWO-THIRDS TO GEORGE J. MACY AND ALICE F. WEAVER, OF SAME PLACE.

STREET-SWEEPER.

SPECIFICATION forming part of Letters Patent No. 468,458, dated February 9, 1892.

Application filed March 4, 1891. Serial No. 383,712. (No model.)

*To all whom it may concern:*

Be it known that I, JOHN C. SLAWSON, of Indianapolis, in the county of Marion and State of Indiana, have invented certain new and useful Improvements in Street-Sweepers; and I do hereby declare that the following is a full, clear, and exact description thereof, reference being had to the accompanying drawings, in which like letters refer to like parts.

My invention relates to the construction of street-sweepers, and has for its object the providing of improved means by which the dirt can be removed from the streets by the sweeper itself and the additional labor of shoveling into carts be obviated, and it will be understood from the following description.

Figure 3:
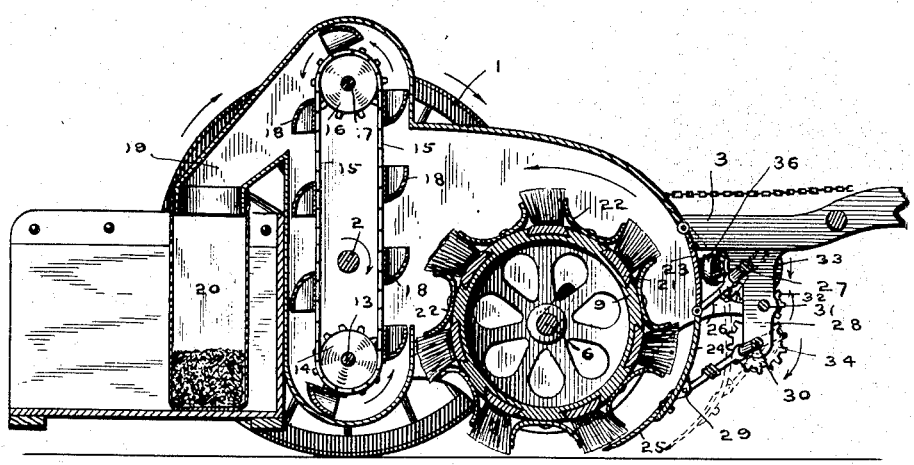
Figure 4:
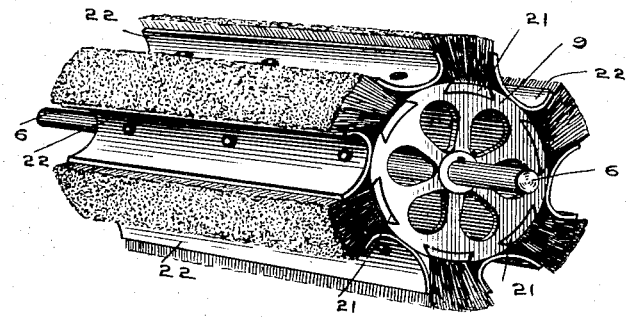

In the drawings, Figure 1 is a side elevation of a street-sweeper embodying my invention, the front part being broken off. Fig. 2 is a top plan view of the same. Fig. 3 is a vertical longitudinal section through the sweeper on the line $xx$, Fig. 2. Fig. 4 is a detached perspective view of the brush-cylinder with the brushes mounted thereon.

In detail, 1 are the rear wheels of the sweeper, rigidly mounted on the axle 2, which is carried in boxings on the under side of the frame-work 3. 4 are gear-wheels, also mounted on the axle, which engage with smaller gear-wheels 5, mounted on the ends of the shaft 6, which is journaled in adjustable arms 7, pivoted to the frame-work and having chains attached to their outer ends, which pass over pulleys 8 and are operated in any ordinary manner by the driver for the purpose of raising or lowering the brushes.

Mounted on the shaft 6 and within the frame-work is the brush-cylinder 9, which is shown in detail in Fig. 4. On this same shaft, within the arms 7, are mounted sprocket-wheels 10, which are connected by loose chains 11 to sprocket-wheels 12, mounted on the outer ends of the shaft 13, which has bearings in the frame-work. Within such frame-work, on the same shaft, are sprocket-wheels 14, which are connected by sprocket-chains 15 to the sprocket-wheels 16, mounted on a shaft 17, also having bearings in the frame-work and in a vertical line with the lower one.

To the chains 15 are attached the buckets 18, of any suitable construction.

19 is a chute formed in the upper part of the frame-work, into which the refuse and dirt are thrown from the buckets, and it has a mouth-piece, to which a bag 20 or other receptacle may be attached in any suitable manner.

The brush-cylinder 9, as shown in Fig. 4, is mounted on the shaft 6 and has dovetailed grooves in its face, into which are adapted to fit the bases 21 of the brushes, which are preferably made of fine steel wire. Between the brushes thin metal plates 22, of a concave form, are attached to the cylinder by bolts, and these plates form pockets, in which dirt and other refuse is carried, and they also form supports against the brushes and prevent their being flattened out and bent, as is commonly the case.

Directly in front of the brush-cylinder is an oscillating or swinging apron, which is formed of an upper section 23, swung from the frame-work. To this is hinged a lower portion 24, which has an adjustable extension 25 at its lower end. To the upper section of this apron are hinged rods 26, which are connected to cranks on the shaft 27, which has bearings in the brackets 28, attached to the frame-work. Similar rods are pivoted to the lower section of the apron at 29 and are attached to cranks on the shaft 30, also having bearings in the brackets 28.

31 is a counter-shaft having bearings in the same brackets and having on its outer ends small pinions 32, which engage with the pinions 33 and 34 on the outer ends of the shafts 27 and 30. On the shaft 27 and inside of the pinion 33 are mounted beveled gears 35, which engage with smaller beveled gears 36, mounted on shafts having bearings in brackets on the under side of the frame-work. On the opposite end of these shafts are beveled gears 37, which engage with larger ones 38, mounted on the main axle 2, as shown in Fig. 2.

The operation of my machine is as follows: The machine being started and the axle 2 turning, power is transmitted through the gears 4 and 5 to the brush-cylinder, and when it is lowered in contact with the street the brushes sweep the dirt and other refuse up against the oscillating apron, which is caused to move backward and forward, as shown in dotted lines in Fig. 3, through the crank-shaft and their gearing with the main axle, and the dirt and other refuse are carried back by the apron against the brushes and will naturally fall in one of the pockets formed between such brushes, and as the brush-cylinder revolves, the pockets acting as elevators, the dirt and refuse will be carried up and around and be deposited in the boot of the chain elevator, where they will be scooped up by the buckets 18 of the same, by which they are carried up to the top and dropped out in the chute 19 and into the bag 20, that is placed at the mouth of the chute to receive them.

It will readily be seen that a great deal of labor may be done away with by the use of my machine, for the sweepings are gathered up as the machine moves, and, being deposited in bags, can be conveniently handled and removed, and if used for fertilizing purposes are ready to be stored away until disposed of.

What I claim as my invention, and desire to secure by Letters Patent, is the following:

1. A street-sweeping machine supported upon wheels, the rear ones rigid on their axle, gear-wheels mounted on such axle, engaging with smaller gears mounted on a shaft having bearings in adjustable arms swinging from the frame-work, a brush-cylinder mounted on such shaft, having brushes attached thereto, an oscillating apron formed in sections, such apron being operated by cranks on shafts having bearings in brackets on the frame-work, and beveled gears on the ends of one of these shafts engaging with smaller gears mounted on axles having bearings beneath the frame-work, such axles having beveled gears on their opposite ends which engage with beveled gears mounted on the rear axle of the machine, in combination with an elevating mechanism within the frame-work, operated by chains and sprocket-wheels from the brush-shaft, substantially as shown and described.

2. In a street-sweeping machine, a frame-work supported upon wheels, the rear ones being rigid on their axle, gear-wheels mounted on such axle, engaging with smaller gears mounted on a shaft having bearings in arms swung from the frame-work, such arms and shaft adapted to be raised or lowered by chains passing over suitable pulleys, a brush-cylinder mounted on such shaft, having removable brushes suitably attached thereto, and an automatic oscillating apron adapted to bring the dirt and refuse in contact with the brushes, in combination with elevating mechanism within the frame-work, operated by sprocket-chains from the brush-shaft, substantially as shown and described.

3. In a street-sweeping machine, a frame-work supported on wheels, arms swung from such frame-work, carrying a shaft on which is mounted a brush-cylinder having dovetailed grooves therein adapted to receive brushes, and curved plates interposed between the brushes and suitably secured to the cylinder, forming pockets, substantially as shown and described.

4. In a street-sweeping machine, an inclosing frame-work supported upon wheels, the rear ones being rigid on their axle, gear-wheels carried thereon, a brush-cylinder carried in adjustable arms and within the frame-work, and an elevating mechanism within such frame-work driven in any suitable manner, in combination with an oscillating apron composed of two or more sections, such apron being moved in a horizontal line backward and forward in front of the brushes through a link-and-rod connection, with independent shafts having bearings in brackets supported from the frame-work, such shafts having pinions on their outer ends and operated simultaneously through an intermediate shaft having smaller pinions mounted thereon, one of the crank-shafts having beveled gears mounted thereon and driven from the rear axle through a gear mechanism, substantially as shown and described.

5. In a street-sweeping machine, a cylinder having dovetailed grooves concave in its face, brushes removably seated in such grooves, and stiffening-plates interposed between the brushes and secured to the cylinder, substantially as shown and described.

6. In a street-sweeping machine, a frame-work mounted on truck-wheels, a brush-cylinder revolving with such wheels, and an apron connected to the frame and inclosing the brush-cylinder, such apron composed of two or more sections hinged together and automatically movable toward and from the brushes as the latter revolve, all combined substantially as shown and described.

7. In a street-sweeping machine, an apron covering the brush-cylinder, composed of two or more sections hinged together, the front section connected to cranks or similar mechanism operated by the moving of the truck-wheels, whereby the hinged section of the apron is moved in and out or toward and from the brushes for carrying up and over the material collected, substantially as shown and described.

In witness whereof I have hereunto set my hand this 23d day of February, 1891.

JOHN C. SLAWSON.

Witnesses:
H. D. NEALY,
E. B. GRIFFITH.